Figure 1:
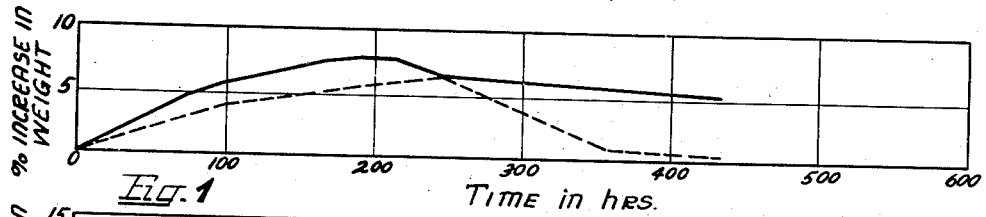

March 29, 1949.   R. E. MEADE ET AL   2,465,906
METHOD OF MAKING NOVEL PRODUCTS FROM WHEY
Filed June 6, 1945

Inventors
Reginald E. Meade
Paul D. Clary Jr.
by Charles N. Field Attys.

Patented Mar. 29, 1949

2,465,906

UNITED STATES PATENT OFFICE 2,465,906

METHOD OF MAKING NOVEL PRODUCTS FROM WHEY

Reginald E. Meade and Paul D. Clary, Jr., Appleton, Wis., assignors to Western Condensing Company, San Francisco, Calif., a corporation of California Application June 6, 1945, Serial No. 597,934

5 Claims. (Cl. 99—57)

This invention relates to methods of making novel products derived from whey and characterized by capacity for being heat treated without the disadvantageous results normally flowing from the heat treatments conventionally carried out on whey and the like.

It is known that certain disadvantages and difficulties attend the heat treatment of liquid lacteal products such as whey. Such heat treatment may be carried out for pasteurization or sterilization purposes, or for more or less complete dehydration, such as concentration, spray drying or drum drying. More particularly, heat treatment of whey gives rise to a cooked or stale flavor and to a brown discoloration. On concentration of whey, a scaly deposit of calcium phosphate may be formed in the vessel used for concentration and a sandy or grainy deposit of lactose may be formed in the concentrate on standing. On spray drying of whey, there is obtained an unpalatable product that tends to cake and lump and which, although noticeably hygroscopic, is not easily dispersed in water. Frequently an unsightly brown discoloration occurs in spray dried whey on storage, which we attribute to a reaction between the nitrogenous matter and lactose content of the whey. Neutralization of any acidity in the whey prior to spray drying does not yield an improved product. Further, a fraction of the lactose content of whey is lost during spray drying, as evidenced by an analytical determination of the lactose content of whey prior to and after spray drying.

We have now discovered that removal of a major portion of the mineral and acid content of whey together with certain other decomposition products prior to any heat treatments of these lacteal products enables us to conduct such heat treatments without any of the disadvantages and difficulties mentioned hereinabove. More particularly, the heat treatments in question may be carried out without imparting a cooked or stale flavor to the product being treated and without the occurrence of brown discoloration either on heat treatment or on subsequent storage. Concentration may be carried out without any deposition of calcium phosphate, and the concentrated product can be stored without formation of precipitate of calcium phosphate or of coarse, grainy or sandy lactose particles. Such demineralized, deacidified whey may be spray dried to form a stable, relatively non-hygroscopic, palatable, easily dispersible, free flowing powdery product that does not turn brown on storage. The products of the methods of this invention contain substantially the whole lactose content of the starting material together with a modified form of the protein content of the original starting material but are devoid of a major portion of the mineral and acid contents and certain decomposition products of the starting material.

For the preparation of the novel compositions of the present invention we remove from whey a major portion of the mineral and acid (including amino acid) content. The reason for the removal of these milk constituents, especially the removal of amino acids, will become apparent from disclosures made hereinbelow.

More particularly, a liquid lacteal product such as whey is first contacted with a decationizing medium to lower its pH value and then contacted with a deacidifying (acid absorbent) medium to raise its pH value. Alternately sufficient proportions of the whey to be treated can be admixed with a cation exchange medium and, after removal of the cation exchange medium, the product can be admixed with a deacidifier. Repeated successive treatments with decationizers and deacidifiers can be carried out until a substantial reduction in the mineral and acid content of the product has been effected, for instance, to a 3.0% or smaller ash content. If the initial treatment with a decationizing medium is carried out so as to lower the pH value to below 2.0, and the initial succeeding treatment with a deacidifying medium is carried out so as to raise the pH value of the product to about 6.0 to 7.5, further treatment with such media is ordinarily not required.

If desired, the whey may be alternately percolated through decationizing and deacidifying media, in repeated cycles, without bringing the pH down to the isoelectric point of the whey protein, whereby precipitation of such protein is avoided.

It is therefore an important object of the present invention to provide lacteal products derived from whey and capable of being heat treated without acquiring a cooked or stale flavor and without brown discloration.

Another object of the present invention is to provide a method for heat treating whey in the absence of a major portion of the mineral and acid (including amino acid) contents thereof.

Another object of the invention is to provide a method of treating liquid lacteal products to prevent brown discoloration on subsequent dehydration and/or storage and including the step of reducing the amino acid content of said products prior to heat treatment or storage thereof.

Another object of the present invention is to provide a novel type of liquid lacteal product comprising lactose as the predominant ingredient and distinguished by excellent keeping qualities, a lactose content that has not been subjected to substantial decomposition, modified mineral, acid and protein contents, and capacity of being more or less completely dehydrated to form relatively stable, palatable products.

A further object of the present invention is to provide a whey concentrate relatively free from discoloration and cooked or stale flavors due to sterilization or canning and capable of being stored without the formation of calcium phosphate deposits and without precipitation of grainy or sandy lactose particles, which concentrates can be spray dried to form palatable, free flowing, easily dispersible powdery products that also contain substantially the total lactose present in the starting material.

Still another object of the present invention is to provide spray dried products derived from whey and having the properties mentioned in the preceding paragraphs.

Other and further objects and features of the present invention will become apparent to those skilled in the art from the following description drawings, and appended claims.

Figures 1 to 4 of the drawings show in graphical form the percentage increase or decrease in weight of ordinary spray dried whey and of spray dried whey treated according to the present invention when exposed to four different atmospheres of various relative humidities for prolonged periods of time.

According to our method ordinary whey obtained by rennet or acid treatment of cow's milk, may be passed through a bed of or otherwise contacted with a decationizing medium capable of replacing metal ions with hydrogen ions, such as the decationizing media disclosed in the article by Robert J. Myers et al., on pages 697–706, volume 33 (1941), of "Industrial and Engineering Chemistry." The resinous decationizing media are particularly suitable. A preferred decationizing medium is "Ionac-C," manufactured by American Cyanamide and Chemical Corporation. Preferably the rate of flow of the whey through the decationizing medium is so regulated that the effluent has a pH of 2.0 or less. The direction of flow is preferably upwardly through the medium, in order to disperse said medium and thereby prevent entrapment of particulate matter.

After exhaustion, the decationizing medium may be revivified by treatment with a dilute acid, for instance, dilute hydrochloric acid.

The decationized whey may then be passed through a bed of, or otherwise contacted by, a deacidifying medium capable of absorbing acids such as one of the "deanionizing" or, more properly, deacidifying absorbent media disclosed in the above identified article by Robert J. Myers et al. Resinous deacidifying media are especially suitable. A preferred material is "Amberlite IR-4" manufactured by Resinous Products and Chemical Company. Preferably the rate of flow of decationized whey through the deacidifying media is regulated so that the effluent has a pH value of from 6.0 to 7.5. The direction of flow should be upward through the medium, to flush away precipitate of protein material into a zone of higher pH conditions where the protein is redissolved.

After exhaustion, the deacidifying medium may be revivified by treatment with a dilute alkali solution, for instance, a dilute solution of sodium hydroxide.

It should be understood that similar results can be achieved by repeated cycles involving successive contacts with a decationizing medium and a deacidifying medium, in which cycles the initial reduction of pH values is carried out only, for example, to a value of about 3.8. In other words, the treatment is distributed between a plurality of cycles, and the whey or other lactose containing material are not exposed to a very low pH.

The whey product obtained by thus percolating whey through a decationizing and deacidifying media has a total solids content of which only about 2.0% may be ash. The remainder of the total solids content consists principally of 86.5% lactose, and 11.5% non-casein protein. Much less ammonia is evolved in the treatment of demineralized, deacidified whey with calcium hydroxide than in the treatment of ordinary whey.

The modified whey obtained by the above disclosed treatment may be concentrated or evaporated, for instance, to a total solids content of 20% to 50%, without the objectionable deposition of any calcium phosphate. On storage, the concentrated whey will be found quite stable, and any precipitation of lactose that may eventually occur takes the form of a very fine precipitate that can be readily dispersed on agitation rather than the form of a coarse, grainy or sandy deposit.

The whey treated as described may also be spray dried, with or without previous concentration, to form a free flowing, stable, relatively non-hygroscopic powder that does not turn brown on storage and is extremely easily dispersible in water. Typical analyses of whey powders made from whey so treated are tabulated as follows:

| No. | Moisture | Acid | Lactose | Protein | Ash | Total |
|---|---|---|---|---|---|---|
| | Per cent | Per cent | Per cent | Per cent | Per cent | Per cent |
| S-1 | 1.6 | 0.2 | 84.5 | 11.2 | 3.3 | 100.8 |
| S-3 | 5.2 | 0.7 | 80.9 | 11.1 | 2.2 | 100.1 |
| S-71 | 1.6 | 0.3 | 82.8 | 12.1 | 2.6 | 99.4 |
| S-108 | 2.8 | 0.2 | 84.6 | 11.0 | 1.7 | 100.3 |

As shown by these data, the analyses all add to about 100%. Ordinary spray dried whey, when analyzed, does not give figures adding up to 100%, as indicated by the following table:

| No. | Moisture | Acid | Lactose | Protein | Ash | Total |
|---|---|---|---|---|---|---|
| | Per cent | Per cent | Per cent | Per cent | Per cent | Per cent |
| 6183 | 1.6 | 5.7 | 57.6 | 13.5 | 13.6 | 92.0 |
| 5894 | 2.4 | 4.6 | 63.0 | 12.3 | 10.8 | 93.1 |
| 5907 | 1.6 | 4.2 | 62.2 | 12.5 | 10.5 | 91.0 |
| 6642 | 3.0 | 3.8 | 68.5 | 11.4 | 10.1 | 96.8 |
| S-102 | 1.6 | 3.0 | 72.1 | 11.8 | 10.4 | 98.9 |

The failures of these analyses of ordinary spray dried whey to add up to 100% is believed to be partially due to a modification of the lactose content during the concentrating or spray drying process.

The protein content of the spray dried whey of our invention differs qualitatively from the protein content of ordinary spray dried whey. This difference is illustrated by a series of parallel experiments with our novel spray dried whey and ordinary spray dried whey carried out by dispersing, as completely as possible, the spray dried wheys in water to make up dispersions containing 6.5% solids. The nitrogen contents of these dispersions were assayed before and after a filtration, with the results shown in the following table. Four samples of the filtered whey dispersions were treated, respectively, by adjusting the pH to 4.65; by adjusting the pH to 4.65 and heating to 100° C. for ten minutes; by incorporating 10% of trichloroacetic acid with the whey; and by dissolving sodium sulfate in the whey to one-half saturation. The whey samples thus treated were filtered, and nitrogen assays were carried out on the filtrates, with the results tabulated hereinbelow:

| Treatment | Whey | | Demineralized whey | |
|---|---|---|---|---|
| | N content, mg./cc. | Per cent precipitated | N content, mg./cc. | Per cent precipitated |
| Whey not filtered | 1.19 | 0 | | |
| Whey filtered | 1.17 | 0 | 1.17 | 0 |
| Whey adjusted to pH 4.65, filtered | 0.96 | 18 | 1.18 | 0 |
| Whey adjusted to pH 4.65, heated for 10 min. at 100° C., filtered | 0.74 | 37 | 0.78 | 34 |
| Whey treated with 10% of trichloroacetic acid, filtered | 0.40 | 66 | 0.54 | 54 |
| Whey treated with sodium sulfate to one-half saturation and filtered | 0.79 | 33 | 0.28 | 76 |
| | | | 0.79 | 33 |

As indicated by the above data, the protein content of our demineralized whey is less soluble in water at pH 4.65 than the protein content of ordinary spray dried whey. In addition the protein content of our demineralized whey contains a larger fraction precipitatable by tri-chloracetic acid than the protein content of ordinary spray dried whey.

Relative non-hygroscopicity of our novel spray dried powder is illustrated by the following experiment. Four chambers of relative constant humidities were provided in the form of four desiccators, the bottom of each desiccator being partly filled with a saturated solution of a salt. The salts used and the resultant per cent humidity in the chamber atmospheres at 20° C. were:

| | Per cent |
|---|---|
| Potassium nitrite | 45 |
| Sodium nitrite | 66 |
| Oxalic acid | 76 |
| Dibasic potassium phosphate | 92 |

Figure 2:
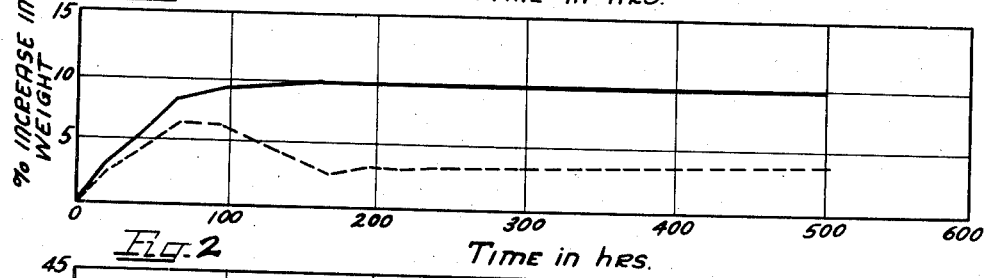
Figure 3:
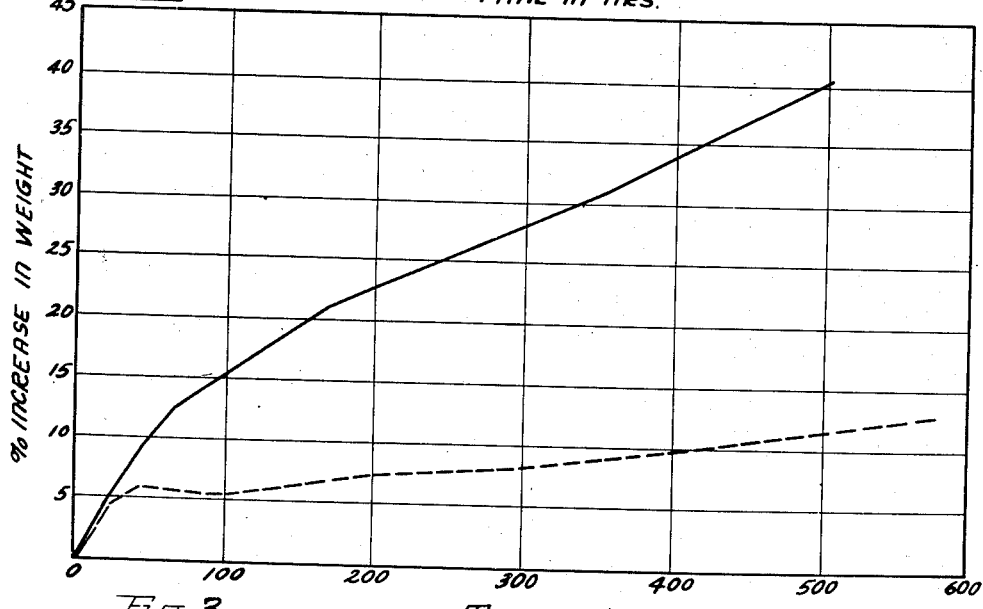
Figure 4:
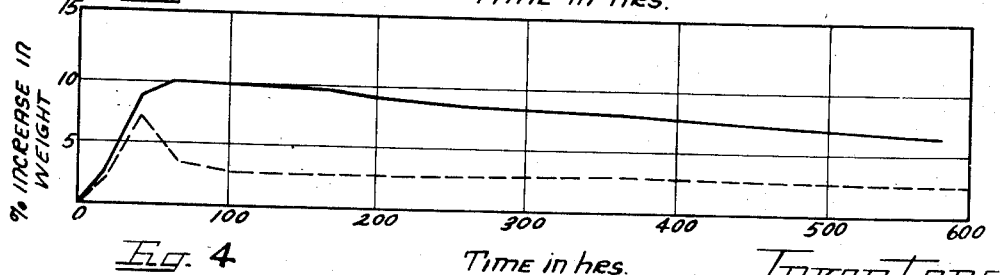

Each desiccator contained two Petri dish halves, one containing thirty grams of the anhydrous ordinary spray dried whey powder and the other containing thirty grams anhydrous spray dried whey powder demineralized and deacidified to a 2% ash content. Each sample was weighed periodically and the net weight noted. At the end of the test period moisture determinations were made by toluol distillation. The results are presented in the graphs of Figures 1 to 4. Figure 1 illustrates, in a solid line, the percent of weight increase of ordinary spray dried whey and, in dotted lines, the percent of weight increase of our novel spray dried whey when exposed for the indicated number of hours to the same humid atmosphere formed by a saturated potassium nitrite solution at room temperature. Figures 2 to 4 illustrate in the same manner, the percents of weight increases of ordinary spray dried whey and our novel spray dried whey when exposed respectively to humid atmospheres created at room temperature by saturated sodium nitrite, oxalic acid and dibasic potassium phosphate solutions. As indicated, in each of these graphs, the results obtained with ordinary spray dried whey are indicated with a solid line, and the results obtained with our demineralized, deacidified whey, are indicated by dotted lines. It will be noted that in all four cases both types of spray dried whey powder show some increase in weight due to adsorbed moisture for the first few days. After that time, the demineralized, deacidified product showed less affinity for water. In all cases, the demineralized, deacidified powder reached a peak and then lost weight. The time required to reach this peak varied with the humidity.

Our reason for the removal of amino acids will become apparent from the following discussion and experimental data. We have surmised that the brown discoloration occurring on heat treatment and/or storage of lactose containing lacteal products is due to a reaction between lactose and/or decomposition products thereof or other carbohydrate material with amino acids or other derivatives or decomposition products of proteinaceous matter present in said lactose containing products. The correctness of our supposition has been borne out by experimental data showing a positive correlation between amino acid content and extent of brown discoloration.

We employed, as one method of verifying our supposition, the above described method of reducing the mineral, acid and amino acid content of whey and ascertained that brown discoloration was thereby lessened or inhibited, at least within reasonable temperatures. It should be understood, of course, that no lacteal product can be rendered immune against brown discoloration at excessively high temperatures effecting pyrolytic decomposition. This inhibition of brown discoloration we attribute both to the removal of amino acids and the like and to the removal of minerals and salts that might promote decomposition of proteins.

For a more positive correlation between amino acid content and extent of brown discoloration we employed "formol" titrations. This test involves essentially titration of a liquid lacteal product to a neutral end point with a sodium hydroxide solution (the "first titration"), addition to the neutralized lacteal liquid of an excess of neutralized formaldehyde, and a final titration with sodium hydroxide solution to a phenolphthalein end point ("formol titration"). The "first titration" is a determination of the acid content exclusive of the amino acid content, of the lacteal liquid, for amino acids contain both carboxyl and amino groups, and hence are, as a rule, practically neutral. But the added formaldehyde reacts with the amino groups, so that the carboxyl groups can then be determined by a titration with a standardized alkali solution, as is done in the "formol titration."

In order to eliminate possible sources of error, all samples used in the experiments described hereinbelow were taken at the same time from one single batch of whey, and a control or blank sample of untreated whey was tested at the same time under identical conditions. Further, in each experiment, tests were also carried out with whey neutralized to the same extent as the whey treated according to the present invention, to eliminate variations in results due to differences in pH value rather than to application of the methods of the present invention. Some samples were investigated without having been dried; others, after concentration and drying. The exact details are given hereinbelow.

We employed liquid whey having a pH of 5.35 and containing 0.34% acid (as lactic). An aliquot portion of this whey was evaporated to dryness and subjected to no other treatment. This dried sample is hereinafter referred to as sample No. 1.

Another aliquot portion of said whey was adjusted to a pH of 6.75 with a sodium hydroxide solution, and then evaporated to dryness, being subjected to no other treatment. This sample is hereinafter referred to as sample No. 2.

Still another aliquot portion of said whey was subjected to the action of decationizing and deacidifying media, as described hereinabove, adjusted to a pH of 6.75 with a small amount of decationized whey, and evaporated to dryness. This sample is referred to hereinbelow as sample No. 3.

Two grams of each of these three whey powder samples were dispersed in 30 ml. of distilled water. The dispersions gave pH readings of 5.7 (sample No. 1), 6.7 (sample No. 2), and 6.6 (sample No. 3).

The results of chemical analyses of the three samples are tabulated as follows:

| Sample | pH | Moisture, per cent | | Protein | Lactose H₂O | Ash | Acid |
|---|---|---|---|---|---|---|---|
| | | 100° C. | Benzol | | | | |
| | | | | Per cent | Per cent | Per cent | Per cent |
| No. 1 | 5.7 | 4.2 | 3.6 | 12.1 | 69.8 | 9.90 | 3.3 |
| No. 2 | 6.7 | 4.7 | 2.8 | 11.8 | 67.9 | 11.1 | 1.8 |
| No. 3 | 6.6 | 3.7 | 3.6 | 12.4 | 83.5 | 1.30 | 0.5 |

It will be noted that these analyses add up to 95.9% (sample No. 1), 93.9% (sample No. 2), and 101.3% (sample No. 3).

Two grams from each whey powder sample were wetted with 30 ml. distilled water in separate Petri dishes and placed in a chloroform oven for 1½ days. At the end of this time there was very little browning. The dishes were then kept in another oven at 174° F. for 19 hours. After removal from this oven, the samples were dispersed in 30 ml. of water and filtered. The filtrates from samples Nos. 1 and 2 were brown, but the filtrate from sample No. 3 was only slightly yellow.

The following table shows the data obtained by determination of total nitrogen content and by "formol" titration of these three whey samples before and after the above described heat treatment:

| Sample | Unheated | | | Heated | | |
|---|---|---|---|---|---|---|
| | Formol Titration, ml. | Total Nitrogen | Per cent of Total Nitrogen in Formol Titration | Formol Titration, ml. | Total Nitrogen | Per cent of Total Nitrogen in Formol Titration |
| No. 1 | 2.65 | 3.71 | 9.81 | 1.29 | 1.81 | 4.79 |
| No. 2 | 2.58 | 3.61 | 9.81 | 1.20 | 1.68 | 4.57 |
| No. 3 | 1.94 | 2.72 | 7.03 | 1.35 | 1.89 | 4.88 |

Two grams of each whey powder sample were also wetted with 30 ml. distilled water in separate Petri dishes and kept for 44 hours in an oven at 175° F. The samples were then dispersed in 30 ml. 0.1 normal sodium hydroxide. The resultant dispersions were filtered, and the percentages of light transmission at various wave lengths were determined spectrophotometrically at various dilutions. The results are tabulated as follows:

| Sample | Dilution | Wave lengths in gammas | | | | |
|---|---|---|---|---|---|---|
| | | 400 | 425 | 450 | 475 | 500 |
| No. 1 | as is | 5.0 | 3.8 | 3.1 | 4.0 | 5.0 |
| | 1:5 | 11.5 | 15.9 | 25.0 | 38.2 | 53.0 |
| | 1:10 | 28.8 | 38.2 | 51.0 | 63.8 | 75.2 |
| | 1:20 | 55.0 | 63.5 | 73.2 | 82.1 | 88.5 |
| No. 2 | 1:10 | 17.8 | 23.5 | 33.2 | 47.8 | 61.0 |
| No. 3 | as is | 6.20 | 5.2 | 7.0 | 11.0 | 18.9 |
| | 1:5 | 31.0 | 40.5 | 51.2 | 62.5 | 72.2 |

Two grams of each whey powder sample were also wetted with 30 ml. distilled water and kept in an oven at 162° F. for 8 days. The whey powders were then dispersed in 30 ml. 0.1 normal sodium hydroxide. Spectrophotometric determinations of percentage of light transmission through dispersions of the various whey powders, before and after heating for 8 days at 162° F., and at various dilutions, are tabulated as follows:

| Sample | Treatment | Dilution | Wave length in gammas | | | | |
|---|---|---|---|---|---|---|---|
| | | | 400 | 425 | 450 | 475 | 500 |
| No. 1 | Unheated | as is | 41.5 | 48.5 | 54.9 | 63.0 | 73.9 |
| | Heated | as is | 9.5 | 10.5 | 16.1 | 26.5 | 43.0 |
| | do | 1:4 | 45.0 | 56.5 | 66.1 | 75.3 | 83.8 |
| No. 2 | Unheated | as is | 40.2 | 48.1 | 56.0 | 64.8 | 75.1 |
| | Heated | 1:2 | 13.0 | 18.4 | 28.4 | 41.5 | 57.0 |
| No. 3 | Unheated | as is | 6.5 | 43.3 | 50.8 | 58.1 | 65.8 |
| | Heated | as is | 20.0 | 26.2 | 34.8 | 43.9 | 53.1 |

The various data disclosed hereinabove show a definite reduction in browning even under extremely severe temperature conditions in the case of whey samples having a lowered content of nitrogenous matter determinable by "formol" titration. This nitrogenous matter is believed to include principally amino acids, but may also include peptides and the like.

It will thus be seen that we have provided novel products derived from whey and characterized by a smaller mineral, acid and decomposition product content than the starting material together with a substantially equal lactose content and a modified albumin content. These novel products can be heat treated without development of a stale or cooked flavor and have excellent keeping qualities. The demineralized, deacidified whey of the present invention can be employed for blending with heat treated milk fat concentrates, such as cream, for the preparation of novel lacteal compositions described and claimed in our copending application entitled "Food product" (filed of even date herewith).

Many details of composition and procedure may be varied within a wide range without departing from the principles of this invention, and it is, therefore, not our purpose to limit the scope of this patent otherwise than necessitated by the scope of the appended claims.

We claim as our invention:

1. A method for the treatment of a liquid whey containing lactose, ash forming constituents, acid, milk protein and complex milk protein derivative decomposition products forming a part of the total assayable nitrogen of the material, the process serving to improve palatability and the ability of the material to withstand heat treatment without browning, the process comprising contacting the material with resinous cation and anion exchange mediums and thereby reducing the content of ash forming constituents of the material and the content of said decomposition products with an accompanying reduction in assayable total nitrogen, and thereby also modifying the protein content of the whey in such a manner that when the treated liquid whey is spray dried it forms a powder which is readily redispersible in water.

2. A method for the treatment of a liquid whey containing lactose, ash forming constituents, acid, milk protein and complex milk protein derivative decomposition products forming a part of the total assayable nitrogen of the material, the process serving to improve palatability and the ability of the material to withstand heat treatment without browning, the process comprising contacting the material with resinous cation and anion exchange mediums and thereby reducing the content of ash forming constituents of the material and the content of said decomposition products with an accompanying reduction in assayable total nitrogen, and thereby also modifying the protein content of the whey, and then drying the treated liquid material to form a powder in which the lactose is substantially anhydrous, the powder being substantially non-hygroscopic and readily dispersible in water and the protein content of the powder because of said modification having a fraction precipitatable by tri-chloracetic acid which is greater than the like protein fraction of the same whey when dried before treatment.

3. A method for the treatment of a liquid whey containing lactose, ash forming constituents, acid, milk protein and complex milk protein derivative decomposition products forming a part of the total assayable nitrogen of the material, the process serving to improve palatability and the ability of the material to withstand heat treatment without browning, the process comprising contacting said liquid whey with a decationizing resinous medium and replacing metal ions in said whey with hydrogen ions until the pH of said whey is reduced at least to 2.0, subsequently contacting said whey with a deacidifying resinous medium and absorbing acids formed by said replacement of said metal ions by hydrogen ions until the pH of said whey is raised to a value between 6.0 and 7.5 and thereby reducing the content of ash forming constituents of the material and the content of said decomposition products with an accompanying reduction in assayable total nitrogen and thereby also modifying the protein content of the whey, concentrating the resulting product to raise its total solids content to at least 20%, and drying the concentrated whey to produce a relatively stable, non-hygroscopic powder easily dispersible in water and containing not more than 3% ash, the protein content of the powder because of said modification having a fraction precipitatable by tri-chloracetic acid which is greater than the like protein fraction of the same whey when dried before treatment.

4. The method of making a stable product derived from liquid whey containing lactose, ash forming constituents, acid, milk protein and complex milk protein derivative decomposition products forming a part of the total assayable nitrogen of the material, which stable product is capable of being heat treated without development of brown discoloration or cooked or stale flavors which comprises successively flowing said liquid whey through beds of resinous decationizing and deacidifying media and thereby reducing the content of ash forming constituents and the content of said decomposition products including peptides and free amino acids and determinable by formol titration, and concentrating and drying the resulting liquid effluent to a dried powder which is relatively stable, non-hygroscopic and easily dispersed.

5. The method of making a stable product derived from liquid whey containing lactose, ash forming constituents, acid, milk protein, and complex milk protein decomposition products forming a part of the total assayable nitrogen of the material, which stable product is capable of being heat treated without development of brown discoloration or cooked or stale flavors which comprises successively flowing liquid whey through beds of resinous decationizing and deacidifying media and thereby reducing the content of ash forming constituents and the content of said decomposition products including peptides and free amino acids and determinable by formol titration.

REGINALD E. MEADE.
PAUL D. CLARY, Jr.

REFERENCES CITED

The following references are of record in the file of this patent:

UNITED STATES PATENTS

| Number | Name | Date |
|---|---|---|
| 1,511,808 | Grindrod | Oct. 14, 1924 |
| 1,937,527 | Otting | Dec. 5, 1933 |
| 2,102,642 | Otting | Dec. 21, 1937 |
| 2,372,233 | Thurston | Mar. 27, 1945 |
| 2,374,407 | Block et al | Apr. 24, 1945 |
| 2,404,367 | Durant et al | July 23, 1946 |